INVENTOR.
DALE E. BOYE.
BY Joseph V. Colaianni
AGENT.

Sept. 29, 1964 D. E. BOYE 3,151,313

RECORD ACTUATED PULSE GENERATING APPARATUS

Filed Feb. 16, 1962 2 Sheets-Sheet 2

INVENTOR.
DALE E. BOYE.
BY
AGENT.

United States Patent Office 3,151,313

Patented Sept. 29, 1964

3,151,313

RECORD ACTUATED PULSE GENERATING APPARATUS

Dale E. Boye, Plymouth, Mich., assignor to Burroughs Corporation, Detroit, Mich., a corporation of Michigan Filed Feb. 16, 1962, Ser. No. 173,707
10 Claims. (Cl. 340—173)

This invention relates to the generation of pulses from encoded information and, more particularly, to the conversion of coded indicia into trains of pulses for identification.

The invention seeks generally to provide an initial form of encoding of and a detecting or decoding apparatus suitable for use in the detection of documents, such as magnetically striped bank ledger cards, for account verification purposes prior to the time that the cards receive magnetized information thereon. More particularly, the invention seeks to provide such encoding on the face of blank ledger cards at the time of and preferably simultaneously with their addressing as by "addressographing" with the customer's name, address and account number so that a verification of the addressed and initially coded blank card can later be made in an automatic ledger processing machine, which includes the subject decoding apparatus, against a previously filled old card of the same account number before balance and other information from the latter card is transferred to the new card.

Among the considerations in the selection of a suitable form of encoding and a decoding apparatus therefor are compatibility with the manner in which the cards are initially addressed and with the subsequent form of encoding the cards are to receive on the magnetized portions thereof; minimization of proper handling; mechanical tolerances in the initial encoding and addressing plates; the limited space available for the initial encoding on the face or printed record receiving surface of the card; the asynchronous character of the ledger processing apparatus in which the decoding apparatus for the initial form of encoding is included and long range variations in the speed of the processing apparatus between different batches or lots of ledger cards processed therethrough; and factors of economy, reliability and design simplicity of the decoding or reading apparatus.

Coding and deciphering systems using data and complementary timing indicies in different tracks, and coding systems using a separate timing bit for each possible data bit position or a single timing or initialing mark or signal for timing the reading of the encoded information may not satisfy various ones of the foregoing considerations and place stringent restrictions on the logical system design.

Accordingly, it is an object of this invention to provide a coding system for the accomplishment of the foregoing ends and which has both timing and information indicia in one track or column.

It is a further object to provide a coding and deciphering system for obtaining a plurality of trains of pulses, one indicative of timing indicia and the other of data indicia, and synchronising these two pulse trains one with the other.

It is a further object to obtain a timing pulse train which contains a pulse for every possible pulse of data, and to use this timing pulse train to synchronize the data pulse train.

It is an additional object to obtain a timing pulse train which contains timing pulses in synchronism with a pulse train developed from data encoded indicia on a document, said timing train having a timing pulse for each possible data pulse even though there is not originally encoded a timing indicium for each possible data indicium.

It is a further object to provide a system for the deciphering of coded indicia by the conversion of single column intermixed timing and data indicia into two synchronized pulse trains one of which is made up exclusively of data pulses and the other of timing pulses.

In accordance with the above and first briefly described, the invention comprises reading means which scan the indicia recorded on a document and converts them into pulses, one for each indicium present. The pulses are then shaped and delayed, and, if more than one column of indicia is to be read, the pulse outputs of each reading station, one of which is provided for each column to be read, are mixed so as to obtain one master pulse train which contains the individual pulse trains corresponding to the various columns of coded indicia. A first gating means then selects only the pulses in this master train pulse which are representative of timing indicia. A second gating means is provided which is responsive only to data pulses in the master pulse train. A pulse encoder, which is responsive to the now separated timing pulses and is capable of emitting any number of predetermined pulses for each input pulse, is also utilized. The output of the pulse encoder then forms applicant's timing pulse train which can be utilized for the deciphering of the data train. A data pulse train, which is representative of the data indicia and is in synchronism with the timing pulse train, is generated by a flip flop which is set into one of its stable states by the detected and separated data pulses and reset back to its original state by the timing pulse train. The output of this flip flop then forms the data pulse train and it will, by necessity since the flip flop is reset by the timing pulse train, be in synchronism with the timing pulse train. These two pulse trains are then fed into a utilization device which takes advantage of the fact that there will be generated and present a timing pulse in the timing pulse train at every possible time that data could possibly exist, and which is responsive to these two synchronized pulse trains and compares the encoded indicia to the customer's account number to verify that the proper document has been selected.

The various features and advantages of this invention will appear more clearly from the following detailed description when considered with the accompanying drawings wherein.

Figure 1:
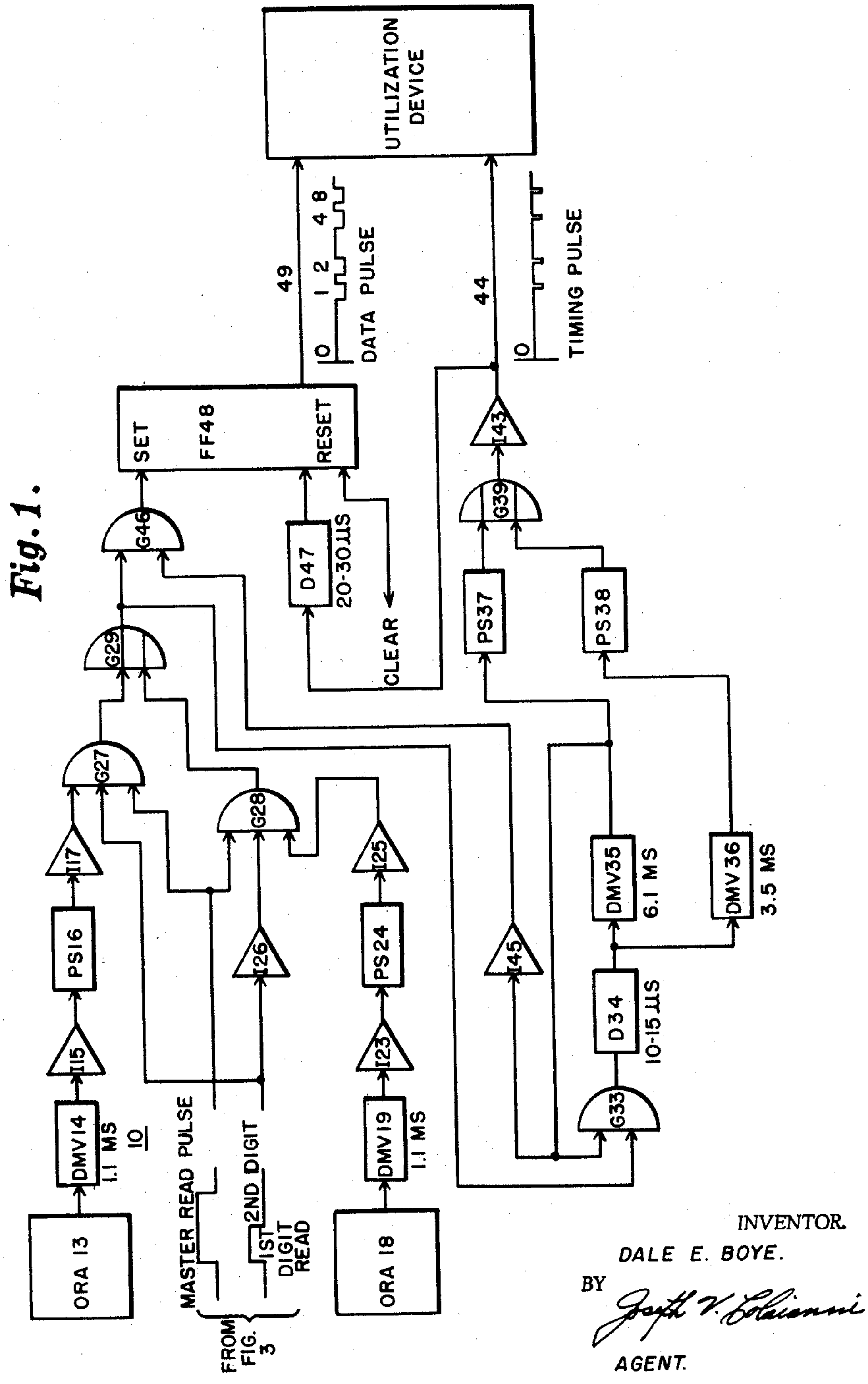
FIG. 1 is a block diagram of the system showing two reading stations to scan two separate columns of information.
Figure 3:
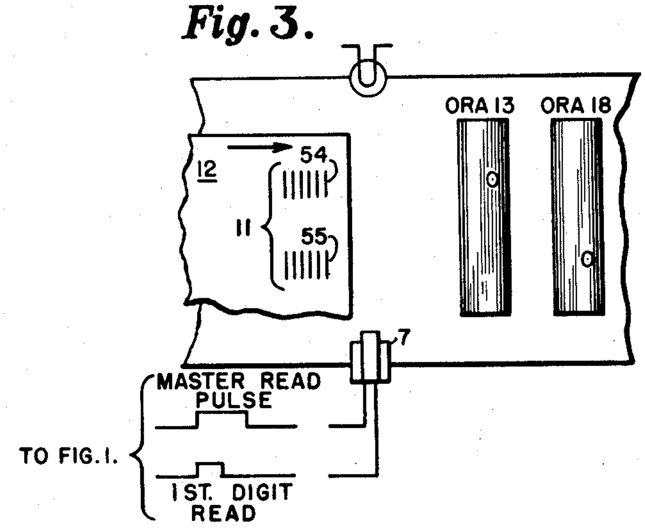
FIG. 3 shows the location of the two reading stations displaced from each other so as to obtain a proper relationship of the pulse trains of information from parallel columns of indicia encoded on a transported document.

Referring now to the drawings, there is shown in FIG. 1, a pulse modulation system 10 which is activated by indicia 11 on a document 12 shown in FIG. 3 and includes a scanner or optical reader 13 to read the indicia on the document fed past the reader. The output spikes of the optical scanner feed a one input delay multivibrator 14, which in turn is connected to one input of a three input AND gate 27 through a serially connected inverter 15, a pulse standardizer 16, and an inverter 17. The second read channel is similarly made up of an electrical series connected optical scanner 18, a delay multi-vibrator 19, and inverter 23, a pulse standardizer 24 and inverter 25. The output of inverter 25, like that of inverter 18 of the first read channel, is connected to one input of another three input AND gate 28. The other two inputs to these three input AND gates 27 and 28 are connected to timing pulse sources which enable gates 27 and 28 for different portions of the read cycle, as will be more fully described hereinafter in the section devoted to the theory of operation. The outputs from each of the gate 27 an 28 feed a two input OR gate 29.

Figure 2:
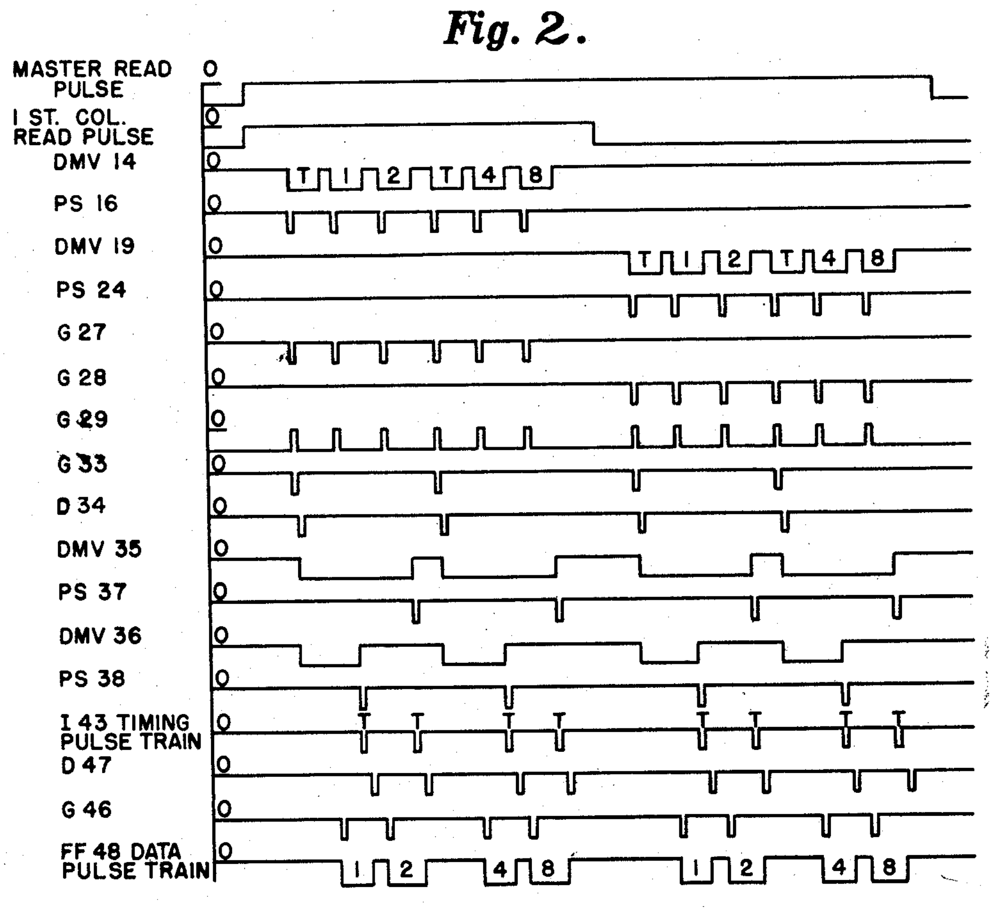
FIG. 2 is a timing diagram of the wave shapes which appear at various identified points in the system and illustrates the manner of cooperation and operation of the various electrical components of the system.

The output of OR gate 29 is connected to one input of each of the two input AND gates 46 and 33. The output of AND gate 33 is connected to the input of delay 34, the output terminal of which is connected to and initiates a pair of delay multivibrators 35 and 36. The output signal from DMV35 is of longer duration than that of DMV36 as shown in FIGS. 1 and 2, the purpose of which is explained hereinafter. The output terminal of delay multivibrator 35, in addition to being connected to a pulse standardizer 37 also is connected to the second input terminal of the two input AND gate 33, and the output terminal of delay multivibrator 35 is connected through an inverter 45 to the second input of AND gate 46.

The output terminal of delay multivibrator 36 is fed to the input terminal of a pulse standardizer 38. The outputs of the pulse standardizers 37 and 38 are then individually connected to one input of a two input OR gate 39. Of course any number of series connected delay multivibrators and pulse standardizers may be connected to a multiple-input OR gate for obtaining a desired number of timing pulses for each pulse indicative of a timing indicium. OR gate 39 is in turn connected to the input terminal of an inverter 43. The inverter 43 then forms one of the two output pulse terminals of this deciphering system and it is over this output lead 44 that the pulse train made up exclusively of timing pulses flows.

The output of AND gate 46 is then connected to the "set" side input terminal of a flip flop 48. One input of the "reset" side of flip flop 48 is connected by way of pulse delay 47 to the output terminal of inverter 43. The other reset input terminal is connected to the clear source which is used at the beginning of a read operation to place flip flop 48 into its initial state. The output terminal of flip flop 48 forms the other output lead of applicant's deciphering system and it is over this lead 49 that data pulses, which are in synchronism with the output timing pulse train, are obtained at the output of inverter 43 as outlined above.

The readers 13 or 18 utilized herein may be of the optical type employing a photoelectric cell or detector receiving reflected light from a light source focused on the document as more fully described and claimed in the copending application entitled "Optical Reader," S.N. 172,453, filed on Feb. 12, 1962, by R. D. Chute and of common ownership herewith. However, any type of reading device having a suitable detector compatible with the form of encoding of the indicia can be used. Applicant's photo optical system utilizes a document which has high reflecting properties and the indicia embossed, in the form of spaced apart, parallel bars or stripes, on the document, as by printing for example, have low reflecting and high light absorption properties. Therefore, in the absence of indicia the light focused on the document will be reflected back to the photoelectric cell and the output of the cell will be at a constant voltage level. However, when the embossed indicia occupies the scanning zone, then, due to the fact that the indicia will absorb most of the focused light, less light will be reflected back to the photoelectric cell. This reduction of reflected light results in a large change of amplitude in the output voltage of the cell. As the indicia moves out of the scanning zone more light will be reflected back to the photocell, and the result is a return of the output voltage to its normal level. The output of the cell will thus be a spike of voltage, and a similar spike will be generated for each stripe of indicium scanned. It is, of course, understood that a document completely black which has low light reflecting properties and having indicia of high reflecting properties thereon could just as easily be used.

The delay multivibrators utilized by applicant, and as shown in FIG. 1 by numerals 14, 19, 35, and 36, are monostable, of standard design and capable of assuming two states, a permanent stable state and a quasi-stable state. A multivibrator will be in the permanent stable state until a triggering signal is applied to its input whereupon it will be transferred to its quasi-stable state. The multivibrator will remain in this quasi-stable state for a time which can be set according to the predetermined desired end. However, after this predetermined time, it will return to its permanent stable state and remain in that state until it is again triggered. For a more complete discussion of the design problems and a more thorough description of the delay multivibrators reference is made to any standard text book dealing with pulse circuits, for example see Chapter 6 of the book by Millman and Taub, entitled Pulse and Digital Circuits, published by McGraw-Hill. While a solid state multivibrator is employed in the present embodiment, a tube equivalent can readily be substituted.

The inverter circuits noted by numerals 15, 17, 23, 25, 26, 43 and 45 in FIG. 1 are of standard design and serve to invert the polarity of the input. Therefore, if the input of an inverter is of a positive going direction relative to ground, it will be changed to a negative going direction at its output terminal. An ordinary plate loaded triode can serve as an inverter with the input at its grid and the output at the plate resistor. Section 13–4 at page 400 of the referred to text by Millman and Taub presents a general description of the standard inverter circuit. In applicant's particular embodiment a solid state variety of inverter circuitry of standard design is used; however, any equivalent circuitry may be substituted.

The pulse standardizer circuits depicted in FIG. 1 by numerals 16, 24, 37, and 38 are of standard design and serve to shape pulses of varying widths into pulses having a predetermined standard width, regardless of the width of the input pulse. One way to accomplish this is by use of a standard delay multivibrator such as described above. Any other equivalent means can also be utilized. In the instant embodiment, a transistor version of a pulse standardizer which is of standard design and which is responsive to changes in voltage from a lower to a higher level is employed. However, any equivalent circuit which will accomplish the desired result and which is triggered by a positive change waveform can be substituted.

Gates 27, 28, 33, and 46 are of the "coincidence" type, commonly referred to as AND gates. These gates may have any number of inputs. For example, gates 27 and 28 require 3 coexisting, positive level inputs before an output will occur, whereas gates 33 and 46 only require the coincident occurrence of two inputs to obtain an output. Any of the numerous known means of accomplishing coincidence detection may be utilized. For a discussion of diode coincidence circuits, reference is made to pages 397–400 of the above referred to text by Millman and Taub.

Gates 29 and 39 are what are commonly referred to as mixers, also called OR gates. These gates serve to mix any number of pulse sources having a common pulse polarity into a common pulse train. This type circuit has at least two inputs and a single output. Gate 29 and gate 39 are of the two input type. Any number of the variety of OR circuits available can be utilized for gates 29 and 39. For a more detailed discussion of OR circuitry, reference is made to pages 394–397 of Millman and Taub. In the present embodiment, conventional NOR logic circuitry is used for both the "coincident" and OR gates; however, any equivalent may be substituted.

Delay circuits 34 and 47 are used to accomplish a delay in the appearance of an output pulse at the output terminal of the delay means for a predetermined time after the pulse first appeared at the input terminals of the delay means. This delay may be achieved by electromagnetic delay lines, accoustical delay lines, or various circuits, such as delay multivibrators. Delays from a few milli-microseconds up to a milli-second may be achieved. For a thorough discussion of delay lines, reference is made to Chapter 10 and page 416 of Millman and Taub. In the present embodiment, a transistor delay circuit which is triggered by the rise time of a waveform is used.

Flip flop 48, sometimes called a bistable multivibrator or an Eccles-Jordan circuit, is a two transistor regenerative circuit which can remain for an indefinite time at either of two stable states, and is switched from one stable state to the other by a negative level signal applied to either its "set" or "reset" input terminals. This circuit is very appropriate for the generation of square wave output pulses in accordance with input pulses applied to its input "set" and "reset" terminals. In addition to the input terminals available at the set and reset sides, there is also available a clear voltage terminal at the reset side. This permits an application of a voltage of proper polarity to reset the output to the desired level at the beginning of a cycle of operation. Flip flop 48 is a standard type circuit and any of the many available circuits which can remain in either of two stable states of conduction can be used. For a thorough discussion of the various considerations and characteristics of bistable multivibrators reference is made to Chapter 5 of Millman and Taub.

*Theory of Operation*

A document 12 bearing indicia in two columns 54 and 55 which are representative of the customer's account number, as shown in FIG. 3, is transported past the reading stations 13 and 18. As each stripe of indicia traverses the focused light beam supplied by the reading stations less light will be reflected back to the photocell housed in the reading apparatus. Then as a stripe of indicia in the information column is moved past the reading zone, a spike of voltage will result. In the coding scheme utilized in this particular embodiment and as shown in FIG. 3, the first stripe of indicia is a timing spot. The second and third stripe positions will be data which represent the binary one and two bits respectively. Each column of information 54 and 55 can have a maximum of six stripe positions for each denominational order. The first stripe position is a timing indicia. The second and third stripe positions, which may or may not be present depending upon the decimal number it is indicative of, are representative of binary one and two bits respectively. The fourth stripe position is a second timing indicium, and the fifth and sixth stripes, which are similar to the second and third and may or may not be present, are respectively representative of the binary bits four and eight. It must be kept in mind that the number of data stripes present will be determined by the decimal equivalent desired to be encoded and can never be greater than decimal nine. Thus in any one column representing one demoninational order of information, there will never be more than five stripes, two of which always will be present and will be timing stripes leaving a maximum of three data bit stripes. Therefore, the timing stripes, which are the first and fourth stripe, will always be present regardless if there is any data present or not, and in addition there may be present any combination of one, two, four, or eight bit stripes of data depending on the desired information to be recorded. For example, if the 8 and 1 bit are present the number encoded is a 9, and if the 4, 2 and 1 bit are encoded then the number is a 7, etc. So that as the indicia bearing document is transported past the reading zone there will be generated, at all times, at least two spikes which are representative of the two timing stripes, and in addition there will also be generated a spike for each stripe of data which is encoded.

These pulses from optical reader 13 are then fed into delay multivibrator 14 which, as described above, transforms these pulse spikes into pulses of equal widths. The wave form labeled DMV14 of FIG. 2 depicts the pulses of equal widths which are generated by the delay multivibrator 14 from the spikes made available to it from optical reader 13. This wave form shows two timing pulses marked T and, as explained above, these will always be present regardless of the encoded data. In addition, data pulses 1, 2, 4 and 8 are also shown. However, as explained above, various combinations of these may be present, but the decimal equivalent of the binary bits present will never exceed the number 9.

These output pulses are then shaped into the desired standard size by pulse standardizer 16. The pulses as they appear after being standardized are shown in FIG. 2 by the wave form labeled PS16. The pulses will then be inverted into positive going pulses by inverter 17.

A similar reading operation will be performed by optical reading unit 18 for, as shown in FIG. 3, there is a second column of indicia 55 which is parallel to column 54 and represents the 10's level or next higher denominational order of numerical information encoded on the ledger card as for account number verification purposes. Reading unit 18 is physically placed beyond reader 13 along the path of travel of the indicia bearing documents 12. This is done so that reader 13 will scan the indicia in column 54 before reader 18 scans the indicia in column 55. The time relationship of the pulses in the pulse train generated by reader 18 after it has been operated upon by delay multivibrator 19, relative to the pulses generated by optical reader 13 after being operated upon by delay multivibrator 14, is shown in the wave form diagrams of FIG. 2. The output of pulse standardizer 24 which acts upon the wave form of delay multivibrator 19 after it has been inverted by inverter 23 is depicted by the wave form labeled PS24. Wave form PS24 will be inverted by inverter 25 into a train of positive going pulses.

There are also provided two master read timing pulses by the apparatus. These pulses can be generated from a photosensing device 7, as shown in FIG. 3, which senses the leading edge of the document and initiates two different flip flops, which are not shown and are of standard design. These may be housed in unit 7 itself or at any convenient location. The outputs of the flip flops will then be fed to the logical circuitry as shown in FIG. 1. The flip flops will be reset into their initial nonconducting states by the utilization device which has to keep track of the number of timing pulses it receives in order to decipher the encoded data. As discussed above, four timing pulses will be generated by applicant's unique circuit arrangement for each number encoded on the document. Therefore one of the two flip flops will be provided with a reset pulse from said utilization device upon the receipt of four timing pulses. This flip flop will thus be actuated for a time in which one column of indicia will be scanned by an optical reader, and it is designated as "1ST COL. READ PULSE" in FIG. 2. The other machine read pulse will be generated by the other flip flop which pulse is activated for twice as long as the first. This will insure that the circuitry, as shown in FIG. 1, is enabled for a time long enough to permit the reading of both columns of indicia 54 and 55 by optical readers 13 and 18. This is accomplished by resetting the second flip flop only after eight timing pulses have been counted by the utilization device. The output of this second flip flop is designated as "master read pulse" in FIG. 2. These pulses are each fed into independent inputs of the three input AND gate 27. The remaining input is fed by inverted wave form PS16 and, upon the coincidence of these inputs, the AND gate 27 will be enabled and an output pulse, which is representative of the coincidence of pulses at all three inputs, will appear at the output. The output of gate 27 is shown by wave form G27 in FIG. 2.

The input wave forms to the other three input AND gate 28 consists of the master read pulse, inverted first column read pulse from inverter 26, and the inverted output from PS24. Inverter 26 provides the complementation of the first column read pulse which is necessary to enable gate 28 during the time at which reader 18 is scanning column 55, as shown in FIG. 3. Inverter 26 is interposed between the input terminal of AND gate 28 and the first column read pulse. The output of AND gate 28 is shown by wave form G28 in FIG. 2.

The purpose of using AND gates 27 and 28 and, therefore, of requiring a coincidence of the information pulses, as supplied by the optical readers with the machine timing pulses, is to insure against noise pulses getting through to the output channels, and therefore being confused for timing or data pulses. This discrimination against noise is accomplished to a large extent by permitting pulses from the optical reader to get through the coincidence gating only during the small period of time which corresponds to the machine read timing cycle. Therefore, it is obvious that only pulses, whether they be noise or information, present during the machine timing cycles can get through coincident gates 27 and 28.

The pulses which occur during the machine read cycle will then be transferred through AND gates 27 and 28, and since, as shown in FIG. 3, optical reader 13 is physically located forward of optical reader 18 and in the path of movement of the indicia bearing document, then it necessarily follows that AND gate 27 will have an output before AND gate 28. The outputs of AND gates 27 and 28 each feed separate inputs of the two input OR gate 29. Since the coincidence of input pulses is not required on an OR gate, whenever an input is present at either of the inputs an output will also occur Therefore, the result will be a combining or mixing of the information pulses from the two separate read channels into one pulse train with the information pulses from optical reader 13 preceding those of reader 18.

This collated pulse train produced by OR gate 29 then is one of the inputs of the two input AND gate 46. The other input to gate 46 is the inverted output voltage level appearing at the delay multivibrator 35. The inversion is acomplished by inverter 45 which is connected between the output terminal of delay multivibrator 35 and the input terminal of AND gate 46. At the same time the collated pulse train also forms one of the inputs to the two input AND gate 33, and the other input to this gate is the uninverted output of delay multivibrator 35. The wave form labeled DMV35, as shown in FIG. 2, indicates that the occurrence of the first output pulse from OR gate 29, which would be representative of the first timing pulse encoded in the column of indicia 54, as shown in FIG. 3, appears when DMV35 is in its "high" level or its stable state. Therefore, as described above, since this output is fed directly to one input of AND gate 33, this gate will be conductive as soon as the first output pulse appears at OR gate 29. Whereas, since the output of DMV35 is inverted before being fed to AND gate 46 then this AND gate will be disabled at the time of occurrence of the first output pulse from OR gate 29.

It is clear, therefore, that the first timing pulse will not be able to pass through disabled gate 46 but will pass through enabled gate 33. After this timing pulse is delayed by delay element D34, as shown by wave form D34 in FIG. 2, it is fed to two parallel branches each consisting of a serially connected delay multivibrator and a pulse standardizer circuit as shown in FIG. 1. From the wave forms marked DMV35 and DMV36 it is clear that DMV35 has an unstable state which occurs at the same time that binary bits 1 and 2, in wave form 29, may be present, and that DMV36 remains in its unstable state only for the time in which binary bit 1 may occur. These binary 1 and 2 data pulses may or may not be present in an actual case, depending on the indicia encoded on the document. It follows from the fact that delay multivibrator 35 will be in its unstable state of conduction for at least two pulses of data that AND gate 33, since it is directly connected to the output of delay multivibrator 35, will be disabled, and that AND gate 46, since it is inverter connected to the output of delay multivibrator 35, will be enabled, during the occurence of binary bits 1 and 2. Therefore, the pulses in wave form G29, which are indicative of data pulses, will be passed only by AND gate 46 and not by AND gate 33. The wave form of DMV35 indicates that it reverts to its stable state of conduction just prior to the occurrance of the fourth pulse output of OR gate 29. This change of state will then return AND gate 33 to an enabled condition, and AND gate 46 to a disabled condition. The above described alternate conduction of AND gates 46 and 33 will again occur for the next two possible pulses of data, and AND gate 46 will be enabled and AND gate 33 disabled during the occurrence of binary bits four and eight. The system will oscillate between AND gate 33 and AND gate 46 for the remaining pulse train.

This state of operation where, due to the requirement of coincidence of the output of delay multivibrator 35 with the collated pulses from OR gate 29 at AND gates 33 and 46, will effectively separate the mixed train of pulses at gate 29 into two trains of pulses at the outputs of gates 46 and 33. The output pulses of AND gate 33 will be made up exclusively of timing pulses, and those of AND gate 46 will be data pulses.

Due to the fact that only timing pulses will be passed by AND gate 33, I will hereafter refer to it as a time pulse discriminating means, and because AND gate 46 only passes data pulses, I will refer to it as a data pulse discriminating means.

As referred to above, the outputs of AND gate 33, which are timing pulses, will feed parallel branches comprising serially connected delay multivibrators and pulse standardizers, so that for every timing pulse at G29 two timing pulses will be generated. As an alternative to this pulse generating scheme the circuit described in copending application S.N. 810,354, filed on May 1, 1959, by Eric Sief and of common ownership herewith and which relates to an apparatus for the generation of any number of output pulses for each input pulse, may be employed. After the generation of two pulses for each timing pulse supplied by the indicia of the document being read, the two parallel branches are then individually fed into separate inputs of a two input OR gate to collate the individual pulses generated into the desired output train of pulses made up exclusively of timing pulses. This collated "TIMING PULSE TRAIN" is shown, so labeled, in FIG. 2.

The output pulse train of AND gate 46, which is made up exclusively of pulses representing indicia of data encoded on document 12 is directly fed into the "set" input side of flip flop 48. The "reset" side of flip flop 48 is fed by the collated timing pulses as produced by OR gate 39, after they have been inverted and delayed respectively by inverter 43 and delay 47. A comparison of the timing pulse train after it has been inverted and delayed, and labeled as wave form D47 in FIG. 2, with the data pulses, pulses 1, 2, 4, 8, etc., of wave form G29, shows that the timing pulses are made to occur between the data pulses. This arrangement permits applicant to synchronize the data pulses, which would be represented by the output of the flip flop, with the timing pulse train. Since a comparison of wave form G46 that of D47 shows that the data pulses will occur prior to the timing pulses, it is clear that the first data pulse will set flip flop 48 into its second stable state and that it will remain in that state until a timing pulse occurs to reset it back into its initial state. It is, of course, evident that if no data pulse should occur because let us say, only timing pulses are encoded on the document, then the flip flop will not be set into its second stable state. Then even though the timing pulses will always occur at the reset side of the flip flop to return it to its initial state they will be ineffective since the flip flop has not previously been placed in its second state. The output of the flip flop will, therefore, be a data pulse train which is representative of data encoded indicia on document 12. Furthermore, since the flip flop will always be reset by a timing pulse, which occurs a predetermined time after a first set data pulse and before a second set data pulse, it is axiomatic that the data pulse train will be in synchronism with the timing pulse train. This is shown in FIG. 2 by comparing the two pulse trains labeled "TIMING PULSE TRAIN" and "DATA PULSE TRAIN." FIG. 1 shows these two pulse trains, made up exclusively of timing and data pulses, being fed into a utilization device.

While this specification has described, in considerable detail, a typical embodiment of my invention, it should be understood that the description is intended to be merely illustrative. Many changes in manner of detail may be made in our apparatus by persons skilled in art without departing from the spirit of my invention.

What is claimed is:

1. In a system for transforming spacially positioned coded indicia made up of mixed timing and data indicia on a document into two synchronized pulse trains one representing timing pulses and the other data pulses for use in a suitable utilization device the combination comprising, means for scanning a document and producing a train of pulses from the indicia scanned, pulse encoding means electrically connected to said scanning means responsive to the pulses representative of timing indicia and producing two output pulses for every one input pulse, said output pulses being in a certain predetermined timed relationship, triggerable data pulse sensing means having one of its two inputs electrically connected to said scanning means and responsive to data pulses from said scanning means, the output of said sensing means being at one level of voltage prior to triggering thereof by a data pulse and being set into its second level and remaining in said second level after sensing of said data pulse, and timing means electrically connected between the output of said pulse encoding means and the second input of said data pulse sensing means, said timing means delaying said output pulses from said pulse encoding means and resetting said pulse sensing means to its first level at a predetermined time after it has been set into its second level by the aforesaid data pulse.

2. In a system for reading and identifying coded information in the form of striped indicia on a document which are representative of data and timing information and capable of transforming said indicia into two synchronized trains of pulses one made up of timing pulses and the other data pulses, said documents being transported along a document guide path the combination comprising, means for reading the indicia coded document, pulse generating means electrically connected to said reading means converting each indicium into a pulse of voltage, pulse discriminating means electrically connected to the output of said pulse generating means and responsive to output voltage pulses representative of timing indicia, a first monostable control means electrically connected to said pulse discriminating means, said first monostable control means responsive to each output pulse of said discriminating means and emitting an output pulse having predetermined characteristics, a second monostable control means electrically connected to said pulse discriminating means, said second monostable control means responsive to each output pulse of said discriminating means and emitting an output pulse having predetermined characteristics, pulse mixing means electrically connected to said first and said second monostable control means combining the output pulses of said first and said second monostable control means into one train of pulses, bistable control means having at least two inputs and one output terminal one of said input terminals connected for receiving said voltage pulses from said pulse generator and responsive only to voltage pulses which are representative of data indicia, the other input electrically connected to the output of said mixing means and responsive to pulses from said mixing means, said bistable control means being in one of its stable states in the absence of any input pulses and responsive to a data input pulse from said pulse generator to be set into its second stable state and reset into its initial stable state by said timing pulse from said pulse mixing means.

3. A system as described in claim 2 wherein said first monostable control means has an output pulse which is twice the duration of said second bistable device monostable control means, and wherein the first output pulse of said mixing means which is applied to reset said bistable control means occurs a predetermined time after the occurrence of the first data pulse which sets the bistable control means into its second stable state, and before the occurrence of a second data pulse.

4. In a system for transforming spacially positioned coded indicia representative of timing and data information into two synchronized pulse trains one made up exclusively of timing pulses and the other exclusively of data pulses the combination comprising, means for scanning the coded indicia and producing a single pulse for each of the indicium scanned, pulse generating means electrically connected to said scanning means operable only by pulses therefrom representative of timing indicia, and producing a series of timing pulses in predetermined spacial relationship one to the other for each such input pulse, data pulse discriminating means electrically connected to said scanning means and operable only by pulses therefrom representative of data indicia, synchronization means having two inputs and one output, one of its inputs electrically connected to said pulse generating means and the other input connected to said discriminating means, the output of said synchronization means being in an initial stable voltage prior to the appearance of any input data pulse from said discriminating means and transferred into its second stable state by the aforesaid input data pulse and resettable to its initial stable state by the first timing pulse from said pulse generating means, said output pulses being synchronized with said timing pulses from said pulse generating means.

5. In a system having a guide path for the transporting of documents having columnar spaced apart coded indicia consisting of mixed timing and data indicia, and for transforming said indicia into two synchronized pulse trains one made up exclusively of timing pulses and the other of data pulses, the combination comprising, first pulse generating means responsive to the indicia and producing a pulse for each indicium on the document, a first pulse responsive means electrically connected to said pulse generating means, responsive to a first predetermined pattern of pulses therefrom and producing output pulses, a second pulse generating means electrically connected to said first pulse responsive means, responsive to pulses therefrom and producing a plurality of output pulses in a predetermined timed relationship to each other for each input pulse, a second pulse responsive means electrically connected to said first pulse generating means and responsive to a second predetermined pattern of pulses therefrom and producing corresponding output pulses, a bistable synchronization device having two inputs and an output, one of said inputs electrically connected to the output of said second pulse responsive means and the other electrically connected to the output of said second pulse generating means, its output normally being in a first stable state prior to any input pulses and set into a second stable state by an input pulse from said second responsive means, and reset to its normal first stable state by an input pulse from said second generating means, said output pulses from said synchronization device representing data pulses and said output pulses from said second pulse generating means representing timing pulses which are in synchronism therewith, and a utilization device electrically connected for receiving said data and said timing pulses.

6. In a system for transforming parallel columns of spacially positioned coded indicia consisting of mixed timing and data indicia on a document into two synchronized pulse trains one made up only of timing pulses and the other of data pulses, said document to be transported along a document guide path the combination comprising, a first optical reader positioned along the document guide path and parallel to said indicia, scanning a predetermined zone of the document surface, and generating a spike of voltage for each bit of indicium in the scanned zone, a second optical reader positioned along the document guide path rearwardly of said first optical reader and scanning a predetermined zone of the document surface parallel to said first zone, and generating a spike of voltage for each indicium in its scanning zone, a first pulse mixing circuit operably connected to said first and said second optical readers and collating the pulses generated by said optical readers into one train of pulses at its output, first and second coincidence gates each having at least two inputs and one output terminal, the output of said mixing circuit being connected to one input of each of said coincidence gates, a first monostable device having input and output terminals, the input of said first monostable device electrically connected to said output of said second coincidence gate, the output of said first monostable device electrically connected to said second input terminal of said second coincidence gate, complementing means electrically connected between the output of said first monostable device and the other input terminal of said first coincidence gate, enabling said first coincidence gate for periods corresponding to the time during which data pulses may appear in said collated pulse train and enabling said second coincidence gate means to permit passage of only timing pulses present in said collated train of pulses, a second monostable device having input and output terminals electrically connected to the output terminal of said second coincidence gate, second pulse mixing means having at least two input and one output terminal, said inputs individually operatively connected to one of said first and said second monostable devices and mixing the output pulses of said monostable devices into a pulse train made up exclusively of timing pulses, a bistable device having at least two input terminals and one output terminal, one of said input terminals electrically connected to said output terminal of said first coincidence gate, the other input terminal electrically connected to said output terminal of said second pulse mixing means, the output voltage level of said bistable device being in one of its two stable states prior to receipt of any input pulses and transferred to its second stable state by input pulses from said first coincidence gate and reset back to its initial state by pulses from said second pulse mixing means, the output pulses thereby derived being representative of data indicia and in synchronization with said timing pulse train from said second pulse mixing means.

7. In the combination described in claim 6 a pulse delay means electrically connected between said second pulse mixing means and the second input of said bistable device to insure that the first timing pulse of said second pulse mixing means will appear at the second input terminal of said bistable device after the first data pulse appears at the first input terminal of said bistable device.

8. In a system for transforming parallel columns of spacially positioned coded indicia consisting of mixed timing and data indicia on a document into two synchronized pulse trains one made up exclusively of timing pulses and the other data pulses, said document to be transported along a document guide path the combination comprising, a first optical reader positioned along the document guide path, scanning a predetermined zone of the document surface and generating a spike of voltage for each bit of indicium in the scanned zone, a second optical reader positioned along the document guide path rearwardly of said first optical reader and scanning a predetermined zone of the document surface parallel to said first zone, and generating a spike of voltage for each indicium in its scanning zone, a first pulse mixing circuit operably connected to the outputs of said first and said second optical readers and combining the pulses generated by said optical readers into one train of pulses, pulse encoding means electrically connected to said pulse mixing circuit and responsive to the pulses therefrom which are representative of timing indicia and producing two output pulses for every one input pulse, said output pulses being in a certain predetermined timed relationship, triggerable pulse sensing means having at least two input and one output terminals, one of its said inputs electrically connected to said pulse mixing circuit and responsive to data pulses therefrom, the output of said sensing means being at one level of voltage prior to the triggering thereof by a data pulse and being set into a second level and remaining in said second level after sensing said data pulse, and timing means electrically connected between the output of said pulse encoding means and the other input of said pulse sensing means, said timing means delaying said output pulses from said encoding means, and resetting said pulse sensing means to its first level at a predetermined time after it has been set into its second level by the aforesaid data pulse.

9. In a system for transforming parallel columns of spacially positioned coded indicia consisting of mixed timing and data indicia on a document into two synchronized pulse trains one made up exclusively of timing pulses and the other of data pulses, said document to be transported along a document guide path the combination comprising, a first optical reader positioned along the document guide-path, scanning a predetermined zone of the document surface and generating a spike of voltage for each bit of indicium in the scanned zone, a second optical reader positioned along the document guide path rearwardly of said first optical reader and scanning a predetermined zone of the document surface parallel to said first zone, and generating a spike of voltage for each indicium in its scanning zone, pulse encoding means electrically connected to the outputs of said first and said second optical readers and responsive to the pulses therefrom representative of timing indicia and producing a series of output pulses for every one input pulse, said output pulses being in a certain predetermined relationship, triggerable pulse sensing means having two inputs and an output, one of its two inputs electrically connected to the outputs of said first and said second optical readers and responsive to data pulses therefrom, the output of said sensing means being at one level of voltage prior to the triggering thereof by a data pulse and being set into a second level and remaining in said second level after sensing of said data pulse, and timing means electrically connected between the output of the pulse encoding means and the second input of said pulse sensing means, said timing means delaying each output pulse from said pulse encoding means for resetting said pulse sensing means to its first level at a predetermined time after it has been set into its second level by the aforesaid data pulse.

10. A coded document reading system comprising means for scanning items of information recorded serially in any number of parallel tracks on a document, the record in each said track being made up of intermixed data and timing indicia arranged according to a predetermined code, timing indicia selecting means having its input electrically connected to said scanning means and producing an output pulse for each timing indicium, data indicia selecting means electrically connected to said means and producing an output data pulse for each data indicia, timing pulse generating means electrically connected to the output of said timing indicia selecting means responsive to the outputs therefrom, and producing a timing pulse for every bit of data indicia possible according to the predetermined code, synchronization means having input and output terminals, one of the inputs electrically connected to the output of said data indicia selecting means and responsive to pulses therefrom, and the other input electrically connected to said output of said timing pulse generating means and responsive to pulses therefrom, the output of said synchronization means being in a first stable voltage level in the absence of any input pulses and being transferred to its second stable voltage level by the first of said aforesaid data pulses and reset back into its first stable voltage level by the first of said input timing pulses.

No references cited.

UNITED STATES PATENT OFFICE

CERTIFICATE OF CORRECTION

Patent No. 3,151,313 September 29, 1964

Dale E. Boye

It is hereby certified that error appears in the above numbered patent requiring correction and that the said Letters Patent should read as corrected below.

Column 3, line 5, for "gate" read -- gates --; line 6, for "an" read -- and --; column 10, line 10, strike out "bistable device"; column 12, line 71, before "means" insert -- scanning --.

Signed and sealed this 19th day of January 1965.

(SEAL)
Attest:

ERNEST W. SWIDER
Attesting Officer

EDWARD J. BRENNER
Commissioner of Patents